May 3, 1932.  F. I. LAUTER  1,856,770

BEARING AND SHAFT

Original Filed Jan. 18, 1929

INVENTOR
Fred I. Lauter
BY
his ATTORNEY

Patented May 3, 1932

1,856,770

UNITED STATES PATENT OFFICE

FRED I. LAUTER, OF NEW YORK, N. Y.

BEARING AND SHAFT

Original application filed January 18, 1929, Serial No. 333,346. Divided and this application filed August 7, 1930. Serial No. 473,622.

This invention relates to a bearing and shaft.

While the invention concerned is adaptable for use in various connections it is here shown and described for purposes of illustration as being associated with a time control for bread toasters, the present application being a division of pending application Serial No. 333,346, filed January 18, 1929.

An object of the present invention is to provide a device which is of simple and efficient construction and which will afford smooth and easy rotation of the shaft.

A further object is to so construct the bearing that it will include simple and efficient means effective to prevent foreign material from gaining access to the metallic rubbing surfaces.

A further object is to so construct the parts that they will afford a desirable slight endwise movement of the shaft within the bearing.

A further object is to so construct the parts that they may be cheaply and easily produced and assembled.

A further object is to so construct the parts that they will operate efficiently even though the shaft be somewhat out of alignment with its bearings.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

Figure 1:
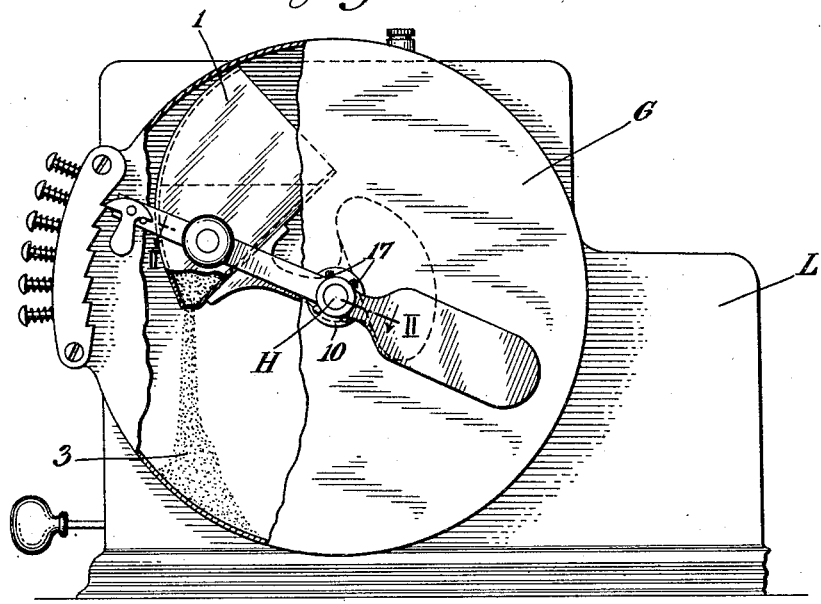
Figure 2:
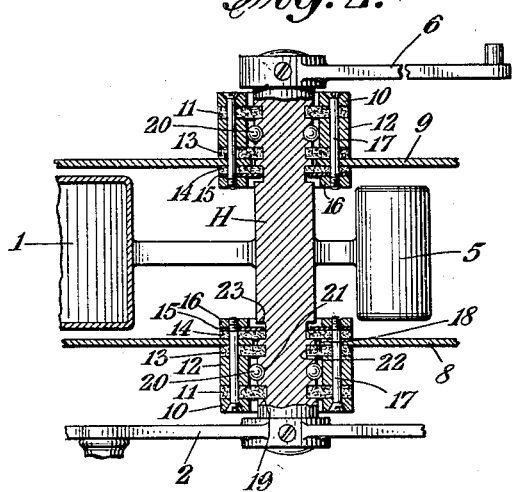

In the accompanying drawings which are to be taken as a part of this specification, and in which I have shown merely a preferred form of embodiment of the invention:

Fig. 1 is a side elevational view of a bread toasting device with a timing mechanism constructed as a part thereof and embodying the bearing comprising this invention, and Fig. 2 is an enlarged transverse sectional view taken upon the plane of line II—II of Fig. 1.

Referring to the drawings for describing in detail the structure therein illustrated, the reference character L indicates a casing containing a suitable type of electrical bread toasting device, said casing having mounted at the side thereof a timing mechanism contained within a cylindrical housing as G, the timing mechanism consisting of a scoop 1 carried by shaft H, the shaft being mounted transversely of the cylinder G and having at its outer end an operating handle 2. The housing contains a quantity of sand. The scoop 1 operated by handle 2 picks up a portion of this sand and holds it in an elevated position, resting upon a stop 4, until sufficient of the sand runs out of the bottom of the scoop to enable a counter-weight as 5 which is also connected with shaft H, to swing the scoop clock-wise ready for picking up another quantity of the sand.

As the scoop swings around under the impulse of the counter-weight 5 an arm as 6 carried by the shaft at the end of the shaft opposite the end carrying handle 2 operates to trip a suitable mechanism, not shown, within casing L to terminate the period of operation of the toasting mechanism which is within said casing.

It will be apparent that in order to properly operate for performing this function the shaft H must not only be substantially mounted but it must be capable of smooth and easy rotation, and furthermore the bearing in which it is supported must be constructed to prevent any of the sand from reaching the bearing surfaces.

In the instance illustrated the bearing is shown to be in duplicate, one bearing as 7 being carried by the front wall 8 of the housing G and the other by the rear wall as 9 of said housing so that said bearings support the opposite ends respectively of the shaft. The two bearings are identical. Each consists of a number of separately formed annular members as 10, 11, 12, 13, 14, 15, 16 all connected together by a plurality of screws as 17 which extend through them and through an interposed portion of the housing wall spaced apart circumferentially of said members and serve to hold all of said members concentric with each other and with the shaft, the members 10—13 being disposed exteriorly of the wall and the members 14—16 being disposed interiorly of the wall.

The wall, as 8, may consist of a simple sheet of sheet metal with an opening as 18 through which the shaft loosely extends.

The member 10 constitutes an outer clamp ring for receiving pressure from the heads of screws 17.

The member 11 consists of a felt washer the central opening of which is smaller than the normal diameter of the shaft and its inner annular portion projects into an annular groove as 19 provided to receive it in the shaft.

The member 12 is made of hard metal and constitutes a ball race, its inner annular surface being of larger diameter than the normal diameter of the shaft and there being a plurality of balls as 20, received in an annular groove 21 of the shaft, arranged to roll around against the inner annular surface of said member. The inner annular surface of the member 12 is preferably formed without any annular groove to receive the balls, it being desirable in most cases that said surface be smooth so that the balls may rub thereagainst at any point in the thickness of said member, thus avoiding necessity for accuracy of assembly, and also providing for a slight desirable endwise movement of the shaft with respect to said member 12 at all times.

The member 13 lies directly between the member 12 and the outer face of the wall 8. It consists of a felt washer the central opening of which is smaller than the normal diameter of the shaft and its inner annular portion projects into an annular groove as 22 provided to receive it in the shaft.

The member 14 lies directly against the inner surface of the wall 8 of the housing. It consists of a felt washer the central opening of which is smaller than the normal diameter of the shaft and its inner annular portion projects into an annular groove as 23 provided to receive it in the shaft.

The member 15 is of thin sheet metal of substantially the same radial dimensions as the member 14 and it lies against the inner surface of the member 14 to hold said member against distortion and at the same time protect said member from the contents of the housing.

The member 16 constitutes an inner clamp ring threaded to receive the threaded inner ends of the screws 17.

It will be seen by this arrangement that the screws 17 serve to hold all of the annular members in concentric relationship and that by tightening said screws said members are clamped against each other and against the interposed portion of wall 8 so that they are thereby rigidly supported in proper position upon said wall, the felt members 13 and 14 constituting gaskets in engagement with the wall to prevent leakage either of the contents of the housing or of oil from the ball race, to the joint between the wall and the bearing parts.

The groove 23 of the shaft which receives the members 14 and 15 is made relatively wider than the thickness of said members so that the shaft is afforded a degree of endwise movement with respect to the member 15.

Since all of the members 11, 13 and 14 are of felt, and hence readily flexible, and since the inner annular surface of member 12 is without any definitely located ball receiving groove, it follows that the shaft is at all times capable of a slight longitudinal movement within the bearing without detrimental effect of any kind. This is of importance particularly since it avoids necessity for accuracy of assembly not only of the individual bearing parts with each other but of each of the bearings with respect to the other bearing. If the walls 8 and 9 of the housing G happen to be a little closer together or further apart in one manufactured structure than in another the provision for longitudinal movement of the shaft within the bearings will effectively prevent any objectionable binding of the parts.

It is also to be noted that, except for the engagement of the balls between the shaft and the members 12 of the two bearings, all other parts of the bearings which engage the shaft are of soft flexible material, which is not only effective to permit endwise movement of the shaft, and to prevent leakage of material along the length of the shaft, but it permits free rotation of the shaft even in the event that one of the bearings should happen to be a little out of alignment with the other bearing. That is to say that if in the manufacture of the housing G and the attachment of the bearing forming parts thereto one of the bearings should happen to be placed slightly out of alignment with the other, still the shaft will be freely rotatable and the bearing parts will perform all of their functions regardless of the inaccuracy of assembly. Here it may be noted that the smooth surface provided upon the ball race members 12 to receive the rubbing engagement of the ball is important in that it does not require that the shaft and the ball race be in any precise alignment in order to function efficiently.

The member 15 has its central opening made slightly larger than the diameter of the inner surface of the groove 23 so as to prevent any binding of the shaft against the member 15 in any event.

It will be apparent that in addition to the features of advantage as above enumerated the form of shaft and bearing illustrated offers efficient protection against movement of any of the contents of the housing outwardly along the shaft into engagement with the balls 20 or of any foreign material inwardly along the shaft to said balls.

As many changes could be made in this construction without departing from the scope of the invention as defined in the following claims, it is intended that all matter contained in the above description, or shown in the accompanying drawings, shall be interpreted as illustrative only and not in a limiting sense.

Having thus described my invention what I claim as new and desire to secure by Letters Patent is:—

1. A journal for shafts, said journal comprising a pair of metallic rings constituting ball races surrounding the shaft adjacent opposite ends of the shaft, the shaft having a pair of annular grooves therein constituting ball races mating with the first mentioned ball races, balls within said races, the shaft having other annular grooves therein at opposite sides of the first grooves respectively, and a plurality of felt washers fixed to said metallic rings and engaging within the last mentioned grooves to protect said ball races.

2. A bearing and shaft therefor, the shaft having a ball race therein and having a plurality of annular grooves, the grooves being partly at one side of the ball race and partly at the other side of the ball race, and the bearing consisting of a plurality of annular members surrounding the shaft in substantially concentric relation with each other, one of said annular members constituting a metallic ball race arranged opposed to the ball race of the shaft, others of said members consisting of flexible felt washers having inner annular portions engaging one within each of the grooves of the shaft, still others of said annular members consisting of clamp rings beyond said felt washers, balls operatively positioned between the mentioned ball races, and means extending between said annular clamp members operable to clamp said members toward each other and against the interposed other annular members for holding all of said annular members assembled.

3. A bearing and shaft therefor, the shaft having a ball race therein and having a plurality of annular grooves, the grooves being partly at one side of the ball race and partly at the other side of the ball race, and the bearing consisting of a plurality of annular members surrounding the shaft in substantially concentric relation with each other, one of said annular members constituting a metallic ball race arranged opposed to the ball race of the shaft, others of said members consisting of flexible felt washers having inner annular portions engaging one within each of the grooves of the shaft, still others of said annular members consisting of clamp rings beyond said felt washers, balls operatively positioned between the mentioned ball races, and means extending between said annular clamp members operable to clamp said members toward each other and against the interposed other annular members for holding all of said annular members assembled, together with a support for the bearing having a portion extending into clamped relation between certain of said annular members whereby the bearing is connected with the support.

4. A shaft and journal means therefor, the shaft having two ball races one adjacent each end of the shaft, the shaft having a plurality of annular grooves at each end portion of the shaft said grooves at the respective ends being positioned partly at one side of the ball race and partly at the other side of the ball race, a pair of separately formed bearings arranged at the respective ends of the shaft, a pair of supports for the respective bearings, each bearing consisting of a plurality of annular members arranged substantially concentric with each other and with the shaft one of the annular members of each bearing providing a ball race in opposition to the respective ball races of the shaft, others of said annular members of the respective bearings consisting of flexible felt washers extending into the annular grooves of the shaft, means interengaging between the several annular members and the support of the respective bearings effective to hold said annular members assembled with each other and with the respective support, and two sets of balls arranged between the opposing ball races at the respective ends of the shaft at least one of the ball races for engaging the balls at the respective ends of the shaft being smooth to thereby enable a limited degree of inaccuracy of alignment as between the two bearings.

In testimony whereof I affix my signature.

FRED I. LAUTER.